S. R. WILMOT.
Weighing Scales.

No. 7,864. Patented Dec. 24, 1850.

UNITED STATES PATENT OFFICE.

SAML. R. WILMOT, OF LA FAYETTE, INDIANA.

MACHINE FOR WEIGHING GRAIN.

Specification of Letters Patent No. 7,864, dated December 24, 1850.

*To all whom it may concern:*

Be it known that I, SAMUEL R. WILMOT, of La Fayette, in the county of Tippecanoe and State of Indiana, have invented a new and Improved Mode of Weighing Grain, called "Wilmot's Cereometer;" and I do hereby declare that the following is a full and exact description thereof, reference being had to the accompanying drawings and to the letters of reference marked thereon.

Figure 1:
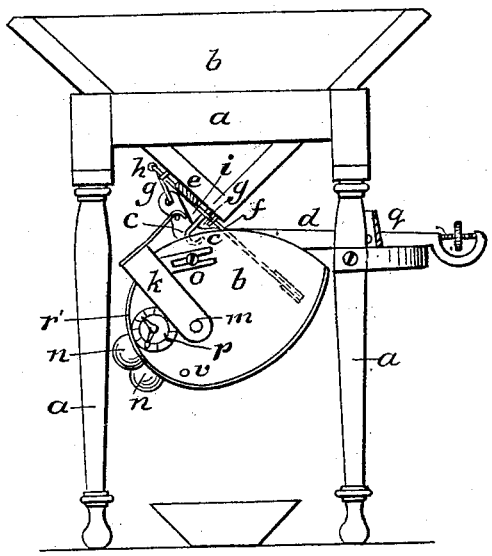
Figure 2:
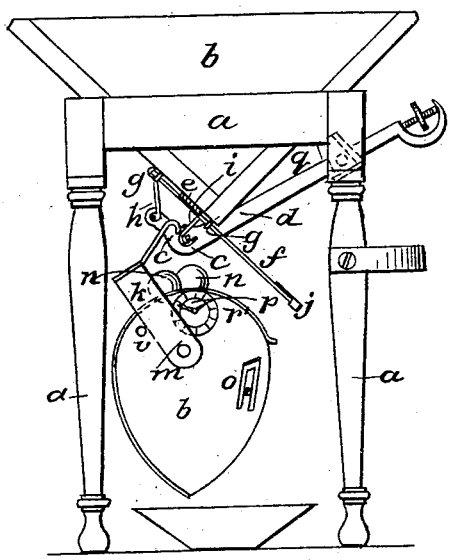
Figure 3:
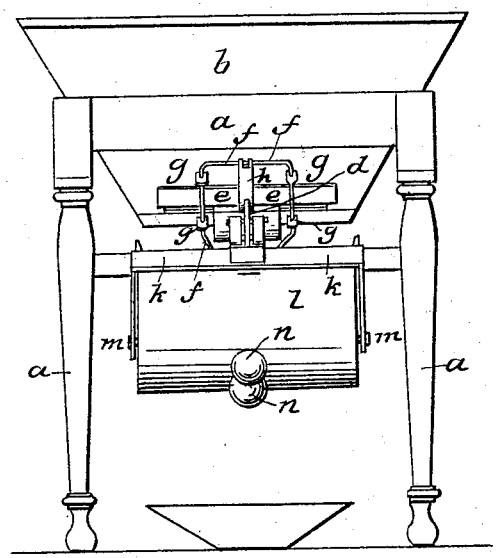

Figure 1 is a side elevation of the machine the scale being in a position to receive grain to be weighed. Fig. 2 is also a side elevation—the scale being in a position to discharge the grain after being weighed. Fig. 3 is a rear elevation.

The nature of my invention consists in the peculiarity of the weighing beam; likewise the manner of arranging the gate so as to tilt the vibrating or weighing scale by the closing of said gate, which, on its return, strikes the gate rod and raises it; also the manner of stopping the operation of the machine by means of a bolt or ketch thrown from the indicator at any given period.

To enable others skilled in the art to make and use my invention, I will proceed to describe its construction and operation:—I construct my machine as follows.

A suitable frame *a* is made, on which rests a large permanent hopper (*b*). At the base of the hopper I arrange a suitable bearing (*c*) on which is hung the weighing beam (*d*) by means of the usual triangular or knife edged shoulders, the peculiarity of which beam consists in the manner of constructing its short arm and placing the bearings so that as soon as the beam begins to tilt the short arm lengthens and the long arm shortens so that the moment the beam starts it strikes with quickness and force. At the base or lower end of said hopper is an orifice that is closed by a sliding valve or gate (*e*) which gate is attached to what I shall term a gate (rod *f*) that plays in four bearings (*g, g, g, g,*) at the upper end of the gate rod is a link or rod (*h,*) connecting it and the short end of the weighing beam. At suitable places on the gate rod are filed notches (*i, i,*) to prevent the gate from rising before the proper time, at the bottom of said rod is a small plate or hammer (*j,*). To the short arm of the beam is suspended a bale (*k*) in which is hung an eccentric vibrating weighing box or scale (*l*) by centers or bearings (*m m*) at the left end of said box or scale is a weight (*n*) which makes that end about two pounds heavier than the right end but is prevented from falling farther back by means of an adjustive stop (*o*). In one end of said box is inserted an indicator (*p*) constructed on the principle of common clock work to which is attached a short pendulum which, by its own gravitation, when the box vibrates operates the indicator and when the amount or number of drafts is weighed for which the machine is set a bolt is caused to spring out of the hole (*r*) and catch against the bale (*k*) and stop the operation of the machine.

The operation is as follows. The machine is put in a level position; the indicator (*p*) is set for the amount to be weighed; the weight (*q*) is set for the number of pounds required to be weighed at each draft; and then the grain must be let into the hopper (*b*) which immediately runs down into the weighing scale (*l*), which, as soon as it receives the proper number of pounds descends; at the same time closing the gate (*e*) and bringing down the hammer (*j*) say with five pounds force against the right hand side of the scale (*l*) which immediately tilts it; the notches (*i i*) catch in the two lower bearings (*g g*) the grain in the scale (*l*) instantly falls out, and as the scale returns, it strikes against the hammer and disengaging the teeth of the rod from the bearing plates (*g g*) the weight (*q*) then predominates and depresses the long arm of the lever and raises the gate (*e*) and the grain again falls into the scale (*l*) as before, and thus the operation is continued till the number of drafts are weighed that the machine is set for; the bolt then flies out of the hole (*r*) and the operation of the machine is stopped by the said bolt striking against the bale (*k*). The stop or pin (*v*) strikes against the bale (*k*) and arrests the farther turning of the scale as soon as it is in a proper position to discharge the grain therefrom.

Having thus described the nature of my invention and improvement in the apparatus for weighing and discharging grain without the attention of an attendant, what I claim as new and desire to secure by Letters Patent is—

1. The employment of the gate rod (*f*) connected to the sliding gate (*e*) and weighing beam (*d*) in combination with the said sliding gate and weighing beam constructed and operating as aforesaid for opening and closing the gate to admit the grain to the dish or scale, or exclude it therefrom at the required periods by the ascent and descent of the dish or scale during the operation of weighing and discharging the grain as herein fully set forth.

2. I also claim the manner of attaching the vibrating weighing scale $l$ to the weighing beam $d$ so that the said weighing scale, as soon as the required quantity of grain shall have entered it, shall descend and close the gate and bring the hammer end $j$ of the gate rod against the lip of the dish or scale and cause the scale to turn on its center $m$ and discharge its load of grain and immediately ascend and strike the gate rod and reopen the gate and assume its former position for another weight of grain—every operation of the weighing apparatus being indicated by an index of the ordinary construction affixed to the end of the scales—the said scale being arranged below a hopper of the ordinary construction.

3. I likewise claim turning the short end of the weighing beam upward in the manner represented in Fig. 1 and placing the arms to which the bale of the scale are suspended on a line drawn through the fulcrum of the weighing beam forming an angle of about 50 degrees with a horizontal line passing through said fulcrum for the purpose of increasing the leverage of the short arm of the beam simultaneously with diminishing the leverage of the long arm as the scale or weighing dish descends, by which the gate is acted upon with increased speed and force in closing the same.

In testimony whereof I have hereunto signed my name before two subscribing witnesses.

S. R. WILMOT.

Witnesses:
WM. P. ELLIOTT,
L. D. SMITH.